United States Patent
Akhter et al.

(10) Patent No.: US 8,867,377 B2
(45) Date of Patent: Oct. 21, 2014

(54) DYNAMIC SELECTION BETWEEN ACTIVE AND PASSIVE PROBING IN COMPUTER NETWORK

(75) Inventors: Aamer Akhter, Cary, NC (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 11/870,674

(22) Filed: Oct. 11, 2007

(65) Prior Publication Data

US 2009/0097409 A1    Apr. 16, 2009

(51) Int. Cl.
*H04L 12/26* (2006.01)
*H04L 12/24* (2006.01)

(52) U.S. Cl.
CPC ............. *H04L 43/12* (2013.01); *H04L 41/5009* (2013.01)
USPC .......................................... 370/252; 709/224

(58) Field of Classification Search
CPC ............................................ H04L 43/10–43/18
USPC ............................ 370/252, 229–237, 224–226
See application file for complete search history.

(56) References Cited

U.S. PATENT DOCUMENTS

| | | | |
|---|---|---|---|
| 6,914,900 B1 * | 7/2005 | Komatsu et al. | 370/356 |
| 6,961,770 B1 | 11/2005 | Ott | |
| 7,173,910 B2 * | 2/2007 | Goodman | 370/252 |
| 7,277,943 B1 * | 10/2007 | Surazski | 709/226 |
| 7,483,379 B2 * | 1/2009 | Kan et al. | 370/237 |
| 2002/0174216 A1 * | 11/2002 | Shorey et al. | 709/224 |
| 2003/0133443 A1 * | 7/2003 | Klinker et al. | 370/353 |
| 2004/0073655 A1 * | 4/2004 | Kan et al. | 709/224 |
| 2004/0174815 A1 * | 9/2004 | Khisti et al. | 370/235 |
| 2005/0102414 A1 * | 5/2005 | Hares et al. | 709/232 |
| 2006/0068769 A1 * | 3/2006 | Adya et al. | 455/418 |
| 2006/0146703 A1 * | 7/2006 | Cha et al. | 370/229 |
| 2007/0115849 A1 | 5/2007 | Ekelin et al. | |
| 2007/0255819 A1 * | 11/2007 | Hua et al. | 709/224 |
| 2008/0062997 A1 * | 3/2008 | Nix | 370/395.2 |
| 2008/0247320 A1 * | 10/2008 | Grah et al. | 370/241 |

OTHER PUBLICATIONS

Kim, Kyu-Han and Shin, Kang. "On Accurate Measurement of Link Quality in Multi-hop Wireless Mesh Networks", MobiCom '06, Sep. 23-26, 2006, pp. 38-49.*
Mark Brodie, Irina Rish, Sheng Ma, Genady Grabarnik, Natalia Odintsove, "Active Probing", I.B.M. T.J. Watson Research, pp. 1-15.
Bradley Huffaker, Daniel Plummer, David Moore and K. Claffy, "Topology Discovery by active probing", CAIDA, UC San Diego, San Diego Supercomputer Center, pp. 1-8.
Istvan Csabai, Peter Haga, Gabor Simon, Jozsef Steger and Gabor Vattay, "The ETOMIC Active Probing Infrastructure—Demo Proposal", Dept. of Physics of Complex Systems.

* cited by examiner

*Primary Examiner* — Benjamin Lamont
(74) *Attorney, Agent, or Firm* — Patent Capital Group

(57) ABSTRACT

In one embodiment, during network operation, it is dynamically determined whether to change from passive probing of communication path metrics to active probing of communication path metrics.

18 Claims, 2 Drawing Sheets

_US 8,867,377 B2_

DYNAMIC SELECTION BETWEEN ACTIVE AND PASSIVE PROBING IN COMPUTER NETWORK

FIELD OF THE INVENTION

The present invention relates generally to probing in computer networks to ascertain network performance.

BACKGROUND OF THE INVENTION

Large enterprises often tie geographically remote sites to central computers. As an example, a banking enterprise may provide communication between a central data center that holds bank customer records and each of potentially thousands of branch banks.

To improve communication reliability and load balancing, "multi-homing" may be used in which more than a single communication link can connect network components. Various technologies, sometimes referred to collectively as "optimal exit link selection", can be used in selecting which particular link is used at a given time, with the decision being reflected in the selection of an "exit link" typically at a border router in the network. The goals may be, e.g., to improve network performance, optimize load distribution, and lower costs for Internet connections.

Link selection can be determined by the results of measuring link performance through probing. Passive probing may be used, in which a network component in essence passively monitors performance by, e.g., detecting whether expected acknowledgement packets are received for transmission control protocol (TCP) traffic, or active probing may be used, in which a network component such as a border router transmits a test signal to a predetermined receiver to monitor the characteristics of the return traffic (e.g., delay, loss, jitter, etc.). Passive probing may be appropriate only for certain types of traffic and may require particular circumstances to function adequately, while active probing consumes network resources requiring, as it does, additional probe test signals to be processed by various components.

DESCRIPTION OF THE INVENTION

In a first embodiment, logic is encoded in one or more tangible media for execution, and when executed is operable to, during network operation, dynamically determine whether to change from passive probing of communication path metrics to active probing of communication path metrics.

In an example, the logic is operable to default to passive probing unless at least one active probing condition arises. The active probing condition may be the absence of any traffic on the link for at least a predetermined period, and/or it may be based on a predetermined type of application using the link, and/or it may be a determination that a metric measured by passive probing has a value that is outside a range of satisfactory values for the metric.

As an example, active probing is not selected when only stateful transport protocol traffic such as but not limited to transmission control protocol (TCP) traffic or stream control transmission protocol (SCTP) traffic is carried on the link. More generally, probing metrics may be determined from the type of application, and active probing may be indicated when it is determined that passive probing cannot satisfy the probing metrics.

In another embodiment a system includes a first border router configured for communicating with a second border router over at least first and second communication links. The system also includes a processor associated with at least one of the routers, within the router or external to it, for causing passive probing of the links. The processor switches to active probing of a link when an active probing condition arises.

In another embodiment, a method is disclosed for selecting a communication link among at least first and second links over which first and second computers communicate. The method includes, for each link, defaulting to passive probing of path metrics, and in response to a predetermined condition on a link, switching to active probing of metrics for the link.

BRIEF DESCRIPTION OF THE DRAWINGS

The details of non-limiting embodiments of the present invention, both as to its structure and operation, can best be understood in reference to the accompanying drawings, in which like reference numerals refer to like parts, and in which.

DESCRIPTION OF EXAMPLE EMBODIMENTS

Overview

Figure 1:
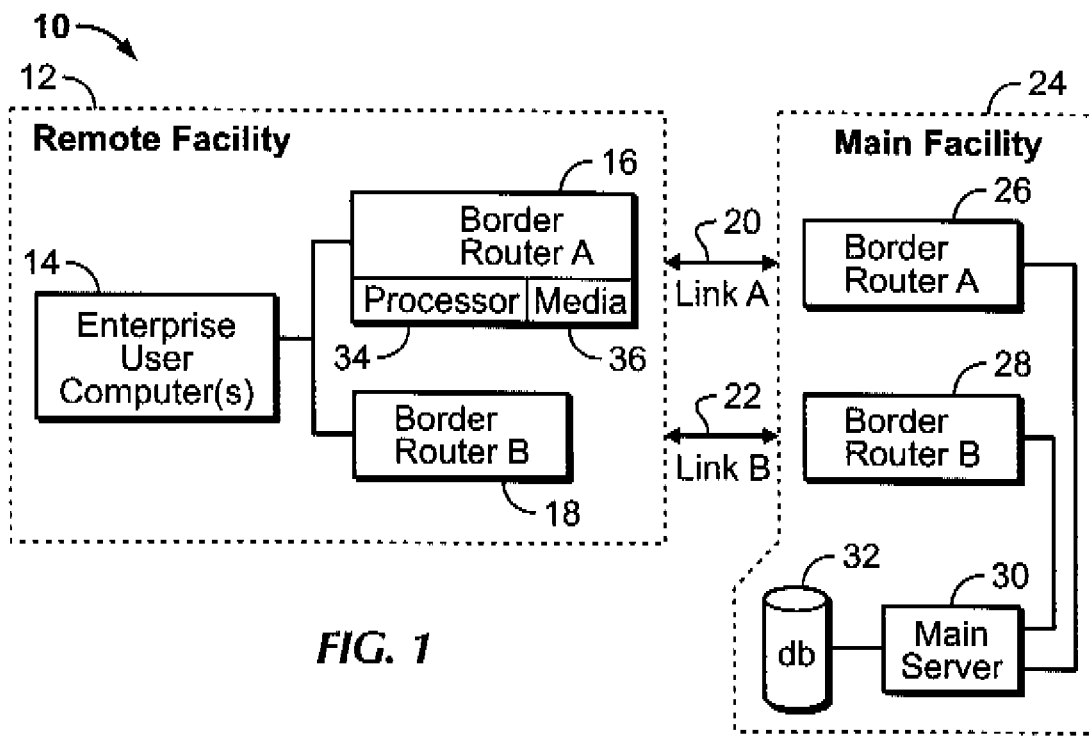
FIG. 1 is a block diagram of an example system.

Referring initially to FIG. 1, a system is shown, generally designated 10, which can include one or more remote facilities 12 (only one facility 12 shown for clarity) that can include one or more enterprise user computers 14 (only a single user computer 14 shown for clarity). The user computer 14 communicates through one or more border routers 16, 18, each of which is typically associated with a respective communication link 20, 22. The links 20, 22 may be thought of in non-limiting embodiments as primary and secondary communication links between the user computer 14 and a main facility 24, which, as shown, can include border routers 26, 28 respectively corresponding to the border routers 16, 18 of the remote facility and communicating with their respective corresponding border routers over respective links 20, 22 as shown. It is to be understood that only one side of the communication path (remote facility 12 or main facility 24) need employ both links 20, 22, in which case an intermediate network component such as a multi-protocol label switching-virtual private network (MPLS-VPN) component can be used to merge traffic from the two links 20, 22 into a single link. Information from the border routers 26, 28 of the main facility 24 may be passed to a main server 30 that may access a database 32. In one non-limiting implementation, the database 32 is a bank database that holds customer financial records, and the remote facility 12 is a bank branch office.

The logic shown in FIGS. 2-4 and described further below without limitation may be executed by any one of or combination of the computers discussed above, including the user computer, the routers, and the server. Typically, each computer, as illustrated for exposition purposes by the border router 16 in the remote facility 12, includes a respective digital processor 34 that can access logic stored on a tangible computer medium 36 such as disk storage, solid storage, or other type of electronic storage.

Figure 2:
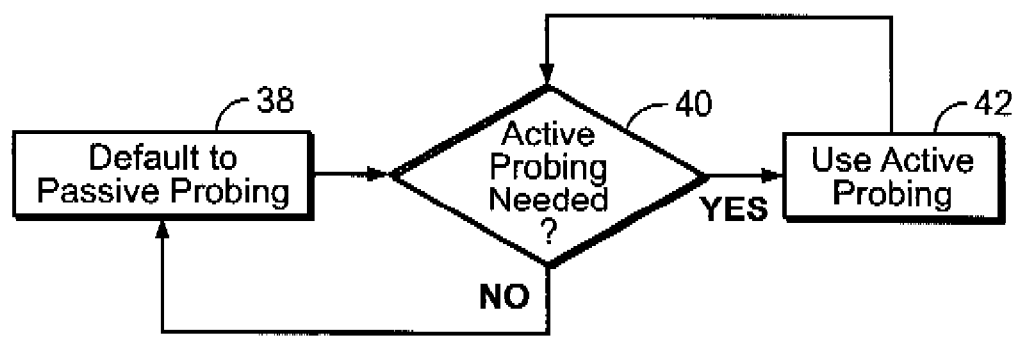
FIG. 2 is a flow chart of example high level logic in accordance with present principles.

Commencing at block 38 in FIG. 2, for each link the system defaults to measuring path metrics including, e.g., latency, jitter, error rate including bit error rate (BER), and other metrics as might be appropriate for a particular system and application type. At decision diamond 40 it is determined whether active probing is required in accordance with disclosure below, and if so, active probing is used at block 42 until it is no longer needed. When active probing is not required, the logic loops back to block 38 to default to passive probing.

As used herein, "active probing" refers to the transmission of a synthetic test transaction whose outcome depends on some of a system's components. As an example, a communication system target, which can be thought of as an abstract representation of a link, can be selected for measurement and is then actively probed with a test transaction. Parameters of the outcome of the test transaction represent path metrics. Passive probing refers to the observation of non-test traffic events and use of the results of the observation to output a measure of path metrics. For example, a passive probe might observe a non-test data packet pass from one node on its way to another node, and then observe when an expected acknowledgement of the packet is returned to the survcilled node. Details of active and passive probing are known and are beyond the scope of this invention. Moreover, based on comparing the metrics of one link against those of the other, the optimum link is selected as appropriate for the traffic type and other circumstances, and details of the selection of a link based on the outcome of probing are beyond the scope of the invention.

Figure 3:
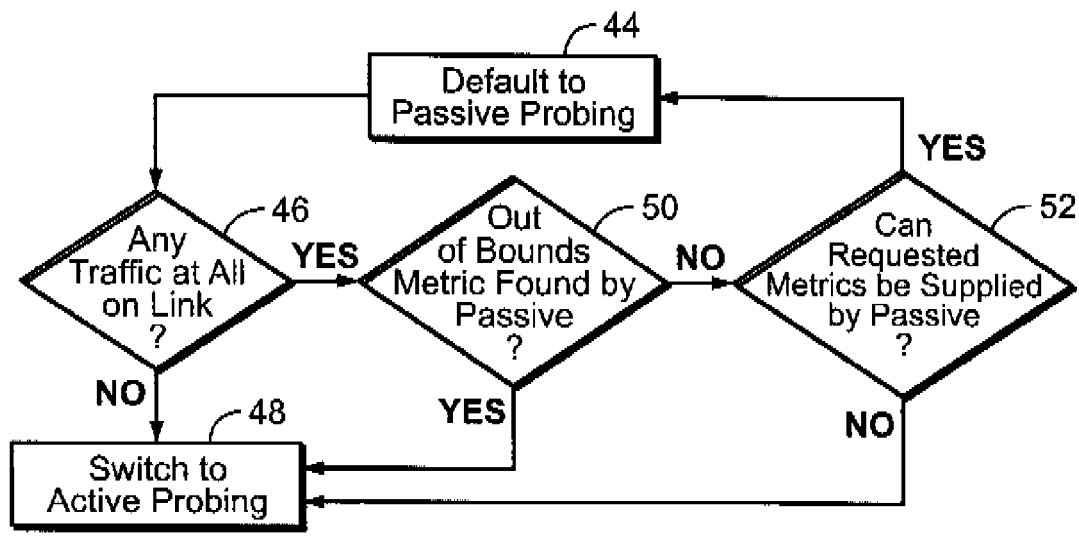
FIG. 3 is a flow chart of example more detailed logic in accordance with present principles.

FIG. 3 illustrates how the decision at diamond 40 in FIG. 2 can be made. As mentioned above, passive probing of path metrics is defaulted to at block 44. At optional decision diamond 46 it is determined whether any traffic at all has appeared on the link for a predetermined period, and if no traffic at all has been present (meaning passive probing cannot be used), the system may if desired switch to actively probing the relevant link at a low probe frequency at block 48.

Even if traffic exists on the link at decision diamond 46, active probing might still be indicated if, at decision diamond 50, an outcome of passive probing is the identification of at least one path metric that is out of bounds, i.e., a metric that has a value that is outside a range of satisfactory values for the metric. In this case, active probing may be selected at block 48 to verify the out-of-bounds determination, typically at a higher probe frequency than when active probing is used because of a lack of traffic as discussed above. In some implementations, a rapid set of active probes may be sent to verify the out-of-bounds determination from passive polling results.

Active probing may still be selected when traffic exists to support passive probing and passive probing returns no out-of-bounds metric if, at decision diamond 52, it is determined whether metrics required to be probed for a determination of link suitability given the circumstances (disclosed further below) can be supplied by passive probing. If not, active probing is selected at block 48; otherwise, passive probing remains the default at block 44.

Figure 4:
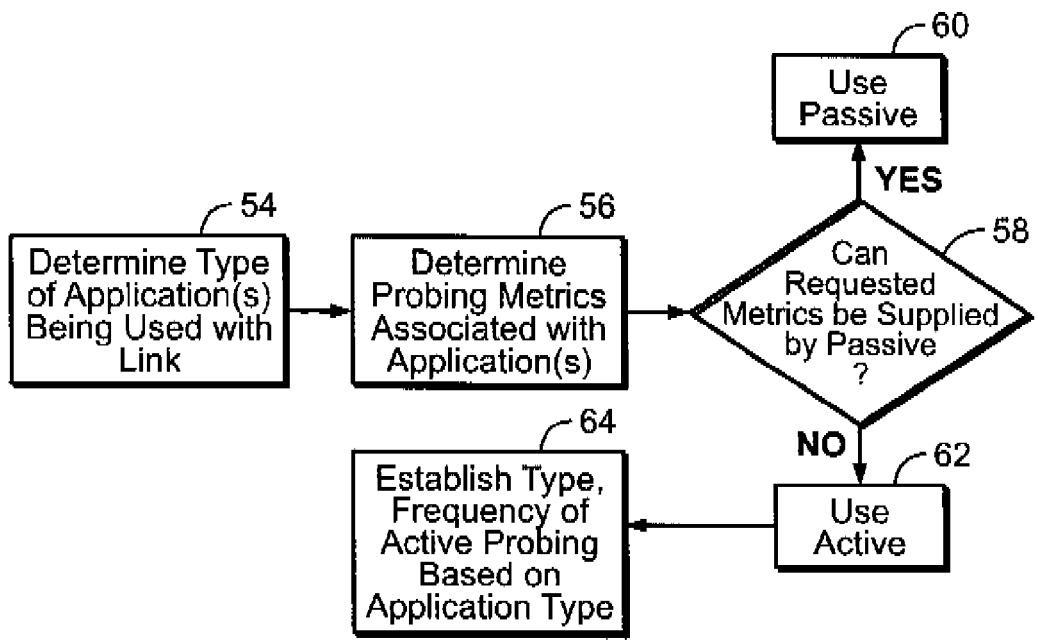
FIG. 4 is a flow chart of additional logic features.

FIG. 4 illustrates example logic that may be used in making the determination at decision diamond 52 in FIG. 3. Commencing at block 54, the type of application currently being used with the link is determined, and then at block 56 probing metrics associated with the type are determined by, e.g., accessing a lookup table or by other means. For instance, a first codec might require that a first set of metrics be in acceptable bounds to support satisfactory communication on a link, whereas a second codec might require different metrics and/or different metric bounds to be satisfied. As another example, where there is no voice traffic currently on a link, latency as might not be needed at all as a metric.

Thus, if a certain metric is unnecessary to determine whether a service level agreement (SLA) for the current type of traffic is satisfied, then the metric is insufficient, standing alone, to trigger a switch to active probing. It is to be understood that when the traffic pattern changes and includes traffic that requires metrics that cannot be satisfactorily measured by passive probing, active probing is switched to. Thus, as stated above, the determination of whether to switch to active probing can be based on application type. In ascertaining application type, network based application recognition (NBAR) can be used for classification. One example implementation of NBAR is discussed in the present assignee's U.S. Pat. No. 6,961,770.

In addition to application type, other criteria such as time of day may be used to establish what metrics are to be measured and, hence, whether to use active or passive probing. For example, under some circumstances jitter may be less important at one time of day than another.

Once the required metrics for the current application(s) using a link are determined, it is determined at decision diamond 58 whether the necessary metrics can be supplied by passive probing. For instance, if an application requires a metric such as jitter that passive probing cannot supply, active probing is indicated. To determine whether passive probing can satisfy a demanded metric for a particular application, the passive probing system can simply be queried for the metric to determine if the metric can be provided by passive probing. If it can, passive probing is used at block 60, but otherwise active probing is selected for the link at block 62.

As indicated at block 64 of FIG. 4, the type of active probing and the frequency with which active test signals are transmitted may be selected based on application type. For example, a metric "X" with threshold "Y" may be required with a first voice codes, whereas a second voice codec might be less susceptible to loss and delay than the first codec so the metric threshold and metric itself might be different, indicating a different type and/or frequency of active probing test transactions.

Also, polling frequency for the active probes can be established based on current link application type. If multiple traffic classes (i.e., multiple applications) are using a link, the application requiring the highest probing frequency would dictate the frequency of active probing transmissions. Such changes in metrics being measured and their respective thresholds, as understood herein, can significantly reduce active probing load because additional information about the applications allow for more lenient active probing when possible.

With the above in mind, it may now be appreciated that for a large number of spoke (remote) sites wishing to perform optimal link connection to a centralized server, traffic load is decreased for the target being polled and does not create superfluous background management traffic since passive polling is defaulted to. Nevertheless, resort to the timing and properties of active polling is made possible when needed.

While the particular DYNAMIC SELECTION BETWEEN ACTIVE AND PASSIVE PROBING IN COMPUTER NETWORK is herein shown and described in detail, it is to be understood that the subject matter which is encompassed by the present invention is limited only by the claims.

What is claimed is:

1. A system having logic encoded in non-transitory media that includes code for execution and when executed by a processor operable to perform operations comprising:
   determining multiple types of traffic that are propagating on a communication path;

determining a type of traffic that requires a highest probing frequency, wherein the type of traffic that requires the highest probing frequency is included in the multiple types of traffic;

determining probing metrics associated with each of the multiple types of traffic;

establishing active probing if a determination is made that the probing metrics cannot be measured by passive probing, wherein the type of traffic that requires the highest probing frequency determines the frequency of the active probing;

prohibiting the active probing if a determination is made that the probing metrics can be determined by passive probing; and prohibiting the active probing if all of the multiple types of traffic on the communication path are stateful transport protocol traffic.

2. The system of claim 1, further comprising:

establishing defaults to passive probing unless at least one active probing condition arises.

3. The system of claim 1, wherein the active probing is executed in an absence of any traffic on the communication path for at least a predetermined period.

4. The system of claim 1, wherein active probing is not selected when voice traffic is carried on the communication path.

5. The system of claim 1, wherein the establishment of the active probing involves a determination that at least one metric measured by passive probing has a value that is outside a range of satisfactory values for the metric and a rapid set of active probes is sent to verify the outside-a-range of satisfactory values for the metric.

6. The system of claim 1, wherein the probing metrics for each type of traffic propagating on the communication path is determined by accessing a look up table.

7. The system of claim 1, wherein the probing metrics for each type of traffic propagating on the communication path is at least partially determined by the time of day.

8. An apparatus comprising:

at least a first border router configured for communicating with a second border router over a link; and a processor associated with the first border router for causing passive probing of the link, the processor determining multiple types of traffic propagating on the link, a type of traffic that requires a highest probing frequency, wherein the type of traffic that requires the highest probing frequency is included in the multiple types of traffic, and probing metrics associated with each of the multiple types of traffic, the processor switching to active probing of the link if a determination is made that the probing metrics for each of the multiple types of traffic on the link cannot be measured by passive probing, wherein the type of traffic that requires the highest probing frequency determines the frequency of the active probing, wherein the active probing is prohibited if a determination is made that the probing metrics for each of the multiple types of traffic propagating on the link can be determined by passive probing, and wherein the active probing is prohibited if all of the multiple types of traffic on the link are stateful transport protocol traffic.

9. The apparatus of claim 8, wherein the active probing is executed in an absence of any traffic on the link for at least a predetermined period, and active probes are sent at a low rate.

10. The apparatus of claim 8, wherein the process of switching to the active probing involves a determination that at least one metric measured by passive probing has a value that is outside a range of satisfactory values for the metric and a rapid set of active probes is sent to verify the outside-a-range of satisfactory values for the metric.

11. The apparatus of claim 8, wherein the probing metrics for each type of traffic propagating on the link is determined by accessing a look up table.

12. The apparatus of claim 8, wherein the probing metrics for each type of traffic propagating on the link is at least partially determined by the time of day.

13. A method comprising:

defaulting to passive probing of probing metrics on a link over which a first computer and a second computer communicate;

determining multiple types of traffic that are propagating on the link;

determining a type of traffic that requires a highest probing frequency, wherein the type of traffic that requires the highest probing frequency is included in the multiple types of traffic;

determining the probing metrics associated with each of the multiple types of traffic;

switching to active probing of the probing metrics for the link if a determination is made that a selected one of the probing metrics for the multiple types of traffic on the link cannot be measured by passive probing, wherein the type of traffic that requires the highest probing frequency determines the frequency of the active probing;

prohibiting the active probing if a determination is made that the probing metrics can be determined by passive probing; and prohibiting the active probing if all of the multiple types of traffic on the link are stateful transport protocol traffic.

14. The method of claim 13, wherein the switch to the active probing includes a predetermined condition of the absence of any traffic on the link for at least a predetermined period.

15. The method of claim 14, wherein active probes are sent at a low rate.

16. The method of claim 14, wherein the switch to the active probing includes a predetermined condition that at least one metric measured by passive probing has a value that is outside a range of satisfactory values for the metric and a rapid set of active probes is sent to verify the outside-a-range of satisfactory values for the metric.

17. The method of claim 13, wherein the probing metrics for each type of traffic propagating on the link is determined by accessing a look up table.

18. The method of claim 13, wherein the probing metrics for each type of traffic propagating on the link is at least partially determined by the time of day.

* * * * *